E. S. FAIRBANKS.
FRICTION CLUTCH.
APPLICATION FILED OCT. 6, 1916.
1,309,472.
Patented July 8, 1919.
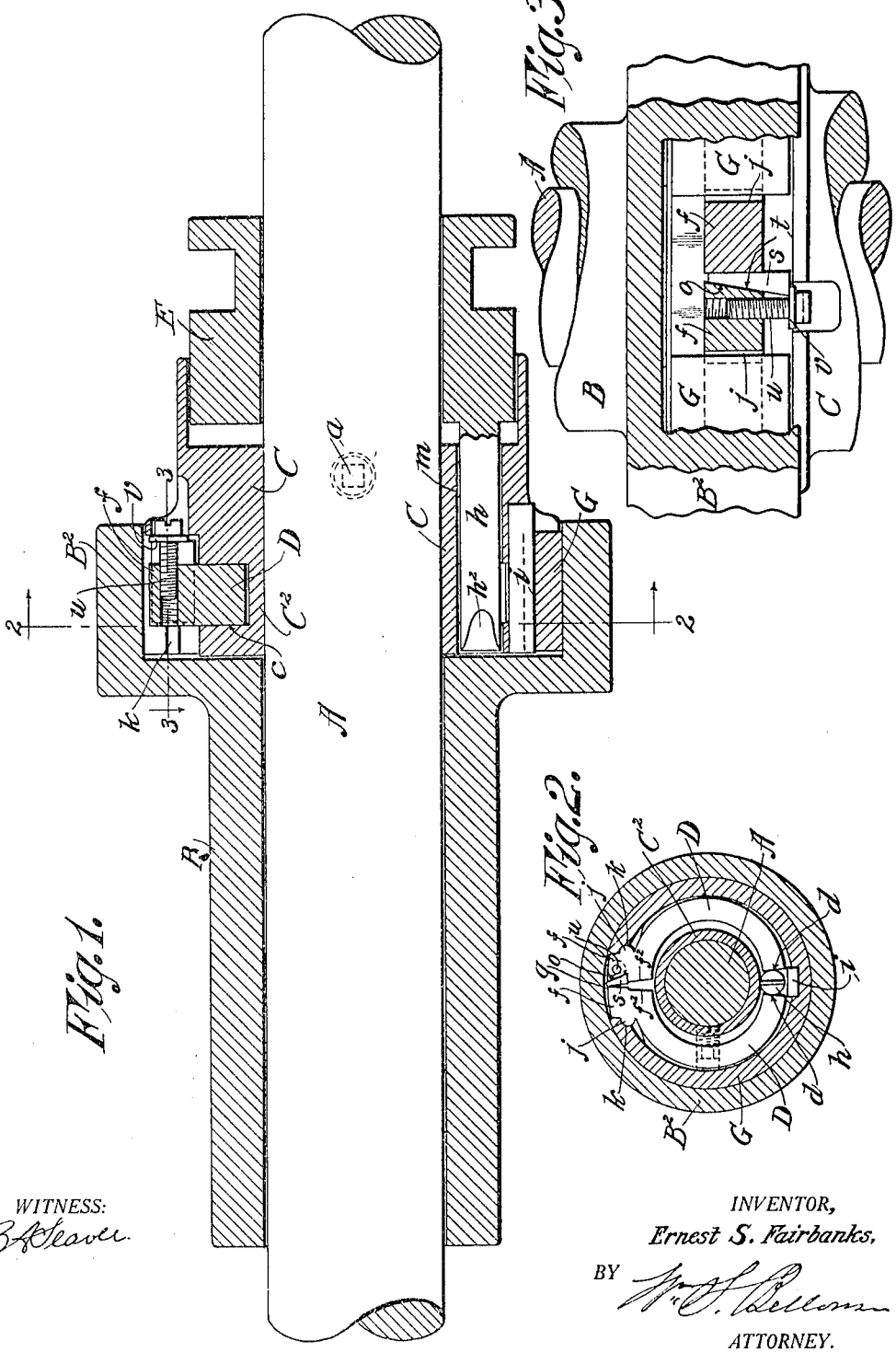
WITNESS:
INVENTOR,
Ernest S. Fairbanks,
BY
ATTORNEY.

UNITED STATES PATENT OFFICE.

ERNEST S. FAIRBANKS, OF GREENFIELD, MASSACHUSETTS.

FRICTION-CLUTCH.

1,309,472.   Specification of Letters Patent.   Patented July 8, 1919.

Application filed October 6, 1916. Serial No. 124,121.

*To all whom it may concern:*

Be it known that I, ERNEST S. FAIRBANKS, a citizen of the United States of America, and resident of Greenfield, in the county of Franklin and State of Massachusetts, have invented certain new and useful Improvements in Friction-Clutches, of which the following is a full, clear, and exact description.

This invention relates to a friction clutch, of a kind embodying a split ring carried by one rotatable member to be expanded and contracted for co-action with the internal circular wall of another rotatable member.

The object of this invention is to provide a friction clutch of simple and inexpensive construction having the parts thereof compactly and closely arranged in relation to each other, whereby practically all of the mechanism and actuating devices of the clutch are inclosed, protected and concealed, and whereby the clutch, in its external aspect, is of sightly and attractive character.

The invention is described in conjunction with the accompanying drawings and is set forth in the claims.

In the drawings:—

Figure 1 is a central longitudinal section through the clutch.

Fig. 2 is a cross section, on a smaller scale, as taken on line 2—2, Fig. 1.

Fig. 3 is a sectional elevation on the scale of Fig. 1, the plane of the parts shown in section being indicated by the line 3—3, Fig. 1.

In the drawings, A represents a power shaft having an annular member or sleeve B, comprising a cup shaped, and endwise open end portion $B^2$, concentrically spaced from the shaft.

C represents a cylindrical member or collar affixed, as by set screw $a$ on the shaft, and comprising an annularly grooved portion $C^2$ which is located within the afore-mentioned cup shaped portion $B^2$ of the member B.

$c$ represents the annular groove in the said member C.

D D represent a pair of approximately semi-circular expanding members, located, as to the thickness thereof, partially within the groove $c$.

Adjacent opposite ends $d$ $d$ of the expanders D are in separation as shown in Fig. 2, while the opposite ends thereof are provided with radially outward extensions $f$ $f$ having convergent inner faces $f^2$, which in substance meet at the point indicated by $g$ in Fig. 2, whereby such expanders have fulcrum engagements one with the other for their slight swinging movements when their opposite ends $d$ $d$ are spread, or permitted to approach each other, by the tapered end of the stud $h$ carried by the slidable clutch operating collar E.

G represents a split expansion ring encircling said expanding members and closely fitting in relation to the inner wall of the cup shaped portion $B^2$.

This expansion ring is by the key $i$, connected midway between its free ends to the shaft affixed grooved member C; and the aforementioned extensions or lugs $f$ of the expanders are located in the cleft at or between the ends of the split expansion ring.

The said lugs have ribs $j$ on their outer sides, and the adjacent ends of the split ring have shallow recesses or grooves $k$ for engagement therein of said ribs.

The stud $h$, of the sliding collar, E, which is parallel with the axis of the shaft, plays, as it moves in unison with the collar, longitudinally in a hole $m$ therefor through the shaft affixed member C, parallel with its axis.

By imparting movement of the collar E to the rightward for a comparatively slight, though ample distance, the tapered end portion $h^2$ of the stud will be withdrawn from between the separated ends $d$ $d$ of the expanders D, permitting them to be swung from their fulcrum point $g$ due to the reaction or contraction of the split ring G, in engagement with the expanders.

The withdrawn stud $h$ being by the collar shoved in the opposite direction, or leftward, as Fig. 1 is viewed, the swinging of the expanders from their common fulcrum point will slightly, though sufficiently, increase the diameter of the split ring to cause it to tightly hug the internal wall in the cup shaped portion of the element B to insure the rotation of such element, and any driving pulley or other transmission member with which it is equipped, as one with the shaft.

The inner face of one of the extension lugs $f$ is recessed and formed with a surface $o$ which is inclined to the general surface of such lug, such inclination being at a slight angle to a plane truly radial from the shaft as best perceived in Fig. 3.

$s$ represents a small metallic block or piece having an inclined side *t* corresponding to and in face-wise contact against the aforementioned inclined surface *o* of the lug.

A screw *u* has the threaded shank thereof engaged in the incline sided lug, and has the shoulder *v* thereof in engagement against the outer end of the inclined piece *s*, so that after considerable use of the clutch in which the parts might become worn, by inwardly turning the screw, the fulcrum point may be varied to compensate for the wear of the parts, that is the piece *s* which may be regarded as an adjunct to one of the lugs by being crowded inwardly in substance widens the pair of lugs to maintain the split ring, when the clutch is released, at the normal or desired degree of clearance relatively to the cup shaped member.

By uniting the split expansible ring to the shaft affixed member, as by a key, such ring is maintained against any possible displacement from its coöperative relation to the lug-provided portions of the expanders.

One end of the sleeve C is made with an extension flange to form a sleeve-like inclosure for the greater portion of the length of the slidable clutch operating collar; and the clutch as to its external aspect presents nothing but smooth, cylindrical surfaces, and is devoid of any external projecting parts, such as the cone operated lever commonly employed in clutches, and objectionable, as being gatherers of dirt, and susceptible of derangement by reason of accumulations of the latter.

I claim:—

1. In combination, a shaft, a sleeve on the shaft having an enlarged cylindrical portion concentrically spaced from the shaft, a collar fixed on the shaft and within said enlarged cylindrical portion, said collar having an annular groove, arcuate members disposed in said groove and having two of their ends in bearing contact with each other to permit relative movement, a C-shaped ring embracing said arcuate members and inclosed by the enlarged cylindrical sleeve portion, and means shiftable on the shaft to expand said arcuate members to force C-shaped ring into frictional contact with the enlarged cylindrical portion.

2. In combination, a shaft, a sleeve mounted thereon and provided with an enlarged end having a circular inner wall surface, a C-shaped ring disposed against said surface and having its ends spaced from each other, a second sleeve fixed on the shaft and having a portion provided with a groove and projecting into the enlarged end of the first sleeve, spreader members disposed in said groove and having their confronting ends spaced from each other, said spreader members having direct fulcrum engagement with the ends of the said C-shaped ring, a wedge movable between the ends of said C-shaped ring to take up wear due to said engagement, a screw threaded in one of said spreader members and having a head bearing against the head of the wedge, and a member slidable on the shaft and provided with a pin having a beveled terminal adapted to be forced between the confronting ends of the spreader members to expand the C-shaped ring.

3. In a friction clutch, in combination, a shaft having a member, comprising a cup shaped portion, loose thereon, a sleeve member affixed on the shaft, comprising an annularly grooved portion located within said cup shaped portion, a pair of approximately semi-circular expanding members, partially located within said grooved portion of the shaft-affixed member, and protruding outwardly therebeyond, adjacent ends of both thereof being in separation while the opposite ends thereof have fulcrum engagements one relatively to the other, an incline sided piece between the fulcrum ends of the expanding members, a screw having a shoulder, the shank of which has a screw engagement in one of the expanders, while the shoulder thereof has an engagement with said incline-sided piece, a split ring encircling said expanding members, and a collar slidable on the shaft and provided with a stud extended parallel with the shaft axis and having a tapered extremity adapted to engage between the separated ends of the expanding members, for expanding, and permitting the contraction of, the latter.

4. In a friction clutch, in combination, a shaft having a member, comprising a cup shaped end portion, loose thereon, a sleeve member affixed on the shaft, comprising an annularly grooved portion located within said cup shaped portion, and having a hole therethrough parallel with the shaft axis, a pair of approximately semi-circular expanding members, engaged within said grooved portion of the shaft-affixed member, adjacent ends of both being in separation while the opposite ends thereof are provided with radially outward extensions having fulcrum engagements with another at their outer end portions, and having ribs on their outer sides, a split expanding ring encircling said expanding members, the adjacent ends of said split ring having recesses for engagement therein of said ribs, and an operating collar endwise slidable on the shaft and provided with a stud parallel with the axis of the shaft endwise movable in the aforenamed hole and having a tapered extremity adapted to engage between the separated ends of said expanding members.

5. In a friction clutch, in combination, a shaft having a member, comprising a cup shaped end portion, loose thereon, a sleeve member affixed on the shaft, comprising an annularly grooved portion located within said cup shaped portion, and having a hole therethrough, parallel with the shaft axis, a pair of approximately semi-circular expanding members, engaged within said grooved portion of the shaft-affixed member, adjacent ends of both being in separation while the opposite ends thereof are provided with radially outward extensions having convergent inner faces, one of such faces being inclined to a plane which is radial of the shaft axis, and having ribs on their outer sides, a split expanding ring encircling said expanding members, having its intermediate portion keyed to said grooved member, the adjacent ends of said split ring having recesses for engagement therein of said ribs, a separately formed piece having an inclined side corresponding to and in facewise contact with the inclined face of the one said lug, a screw having the threaded shank thereof engaging into said lug, and having the shoulder thereof engaging the end of said incline sided piece, and an operating collar endwise slidable on the shaft and provided with a stud parallel with the axis of the shaft endwise movable in the aforenamed hole and having a tapered extremity adapted to engage between the separated ends of said expanding members.

Signed by me at Greenfield, Mass., in presence of two subscribing witnesses.

ERNEST S. FAIRBANKS.

Witnesses:
MAURICE J. LEVY,
ISIDOR D. LEVY.

Copies of this patent may be obtained for five cents each, by addressing the "Commissioner of Patents, Washington, D. C."